Figure 1:
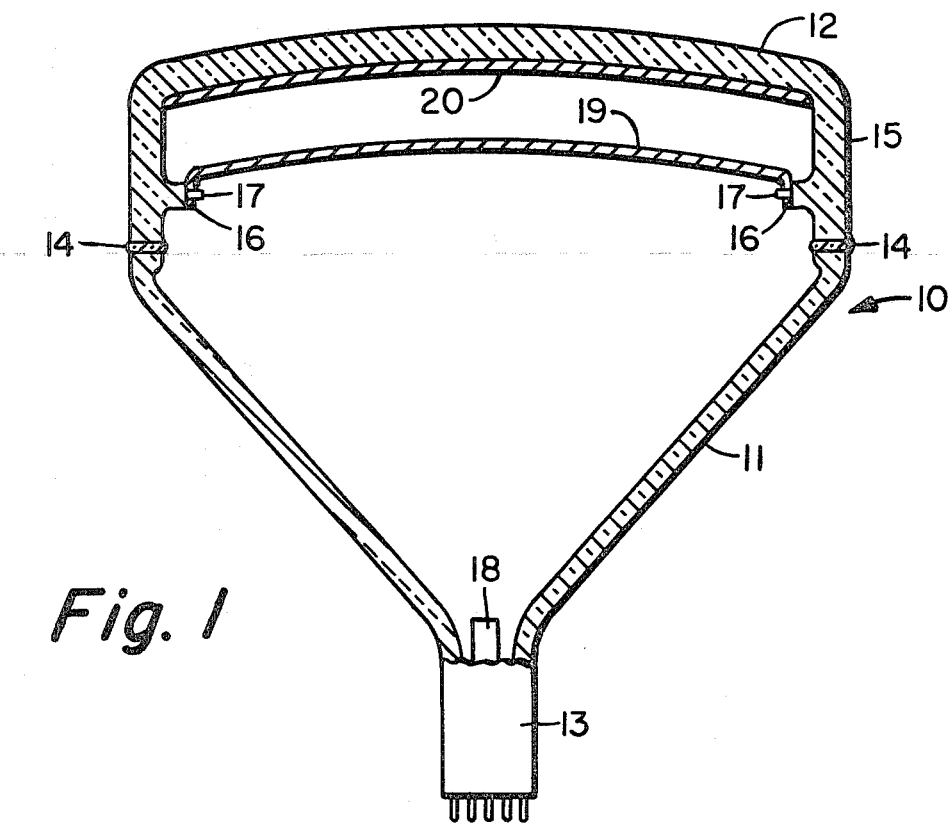

United States Patent [19]

Boyd

[11] 3,805,107
[45] Apr. 16, 1974

[54] FACEPLATE FOR TELEVISION PICTURE TUBE
[75] Inventor: David C. Boyd, Corning, N.Y.
[73] Assignee: Corning Glass Works, Corning, N.Y.
[22] Filed: Feb. 17, 1972
[21] Appl. No.: 227,168

[52] U.S. Cl.................. 313/92, 106/52, 252/478
[51] Int. Cl........ H01j 29/18, C03c 3/04, C03c 3/24
[58] Field of Search.......... 106/52; 313/92; 252/478

[56] References Cited
UNITED STATES PATENTS
3,464,932  4/1969  Connelly et al..................... 106/5 X
2,901,366  8/1959  Smith et al........................... 106/52

FOREIGN PATENTS OR APPLICATIONS
1,091,716  10/1960  Germany............................. 106/52
1,123,857  8/1968  Great Britain....................... 106/52

Primary Examiner—Len M. McCarthy
Attorney, Agent, or Firm—Clinton S. Janes, Jr.

[57] ABSTRACT

The glass faceplate for the envelope of a television picture tube is composed of an alkali metal silicate glass that contains strontia and lithia in its composition and is essentially free of fluorine. Freedom from fluorine minimizes batch volatilization and consequent air pollution during melting of the faceplate glass.

1 Claim, 2 Drawing Figures

FACEPLATE FOR TELEVISION PICTURE TUBE

The invention relates to an improvement in a television picture tube comprising an electron emitting means and an envelope having a faceplate composed of an alkali metal silicate glass that contains strontia in its composition. The strontia containing glass strongly absorbs X-radiation while also strongly resisting glass discoloration from electron bombardment. The invention is specifically concerned with providing a glass faceplate where the glass properties normally specified for this purpose, in particular the optical, electrical and physical characteristics, are substantially the same as those of glasses presently used for the purpose, but wherein the glass composition is altered to minimize air pollution during glass melting.

It is well known that a television tube operates by emission of a beam of electrons from a cathode. This beam is moved over a screen on the faceplate of the tube envelope to selectively activate points or dots of phosphor and thereby create an image. An undesirable side effect is the production of X-radiation when the electrons impact the phosphor.

It is desirable, as a health safety measure, to confine both the electrons and the X-radiation within the television tube. This is easily achieved, except in the faceplate of the tube envelope which necessarily must remain exposed and optically clear. Consequently, continuing attention has been given to the problem of producing a faceplate glass that will provide maximum absorption characteristics, particularly for X-radiation.

Initially, the entire tube envelope, includng the faceplate, was produced from an alkali silicate glass containing on the order of 20 to 30 percent lead oxide (PbO). Such lead glasses combine a high capacity for absorption of X-rays with high electrical resistivity and with viscosity-temperature relationships that provide an easily worked glass. They are, however, subject to severe discoloration which develops during operation of a tube.

It is now known that this phenomenon, known as "browning", may result from either X-radiation, from electron impingement on the glass, or from both causes. U. S. Pat. No. 2,477,329, granted July 26, 1949 to DeGier et al., describes the dual steps of adding cerium oxide ($CeO_2$) to the glass composition and minimizing the amount of reducing oxides, in particular lead oxide, as a solution to the discoloration problem. In particular, the patentees employ BaO in place of PbO.

U. S. Pat. No. 2,527,693, granted to W. H. Armistead, describes a family of electrical glasses in the alkali metal oxide-barium oxide-alumina-silica ($R_2O$-$BaO$-$Al_2O_3$-$SiO_2$) system. Certain of these glasses possess a combination of electrical and glassworking characteristics such that they have been almost universally adopted to replace lead glasses in the production of television tube faceplates.

Recent developments, particularly in the production of color television tubes, have created a need for glasses having a greater absorbing capacity for X-radiation than that provided by the commercially available glasses. Attempts have been made to meet the need by increasing the baria (BaO) content in the Armistead type glass. The resulting glasses are described for example in United Kingdom Specifications No. 1,123,857 and No. 1,231,378 published Aug. 14, 1968 and May 12, 1971, respectively. An adequate increase in BaO content to meet the needs, however, tends to produce glass melting problems, and to impart a high liquidus temperature to the glass.

In addition to an adequate capacity for X-ray absorption, a satisfactory glass must also provide adequate resistance to discoloration and must possess suitable electrical and physical properties. The discoloration from X-radiation can be essentially controlled with cerium oxide, but the similar discoloration from electron bombardment is not so easily inhibited. This requires a glass composition that is inherently resistant to the electron influence.

U. S. Pat. No. 3,464,932, granted Sept. 2, 1969 to J. H. Connelly and G. B. Hares, discloses glasses in a different composition system for television tube faceplates. These are alkali metal silicate glasses containing strontia (SrO). Use of these glasses is based on the fact that SrO has a greater capacity for X-radiation absorption in the range of 0.35 to 0.77 Angstrom units than does BaO. It is further based on the discovery that such SrO glasses are particularly resistant to discoloration by electron bombardment, that is the phenomenon known as "electron browning." These glasses, like the earlier baria glasses of Armistead, generally contain 1-2 percent of fluorine as a fluxing, or glass softening, agent to facilitate glass melting and working.

United Kingdom Specification No. 574,275, granted Dec. 31, 1945 to General Electric Company Limited, and No. 589,202, granted June 13, 1947 to British Thomson-Houston Company Limited, describe the substitution of other divalent oxides in part for lead oxide in lamp and other electrical glasses. United Kingdom Specification No. 734,444, granted Aug. 3, 1955 to General Electric Company Limited, is specifically concerned with glasses for cathode ray tubes and limits the amount of divalent metal oxide substitution in glasses for this purpose. The patent discloses glasses designed to possess properties "comparable with those of high lead glasses in respect to softening point, working range, thermal expansion characteristics and electrical resistivity." This is achieved "by the addition of small amounts of fluorine and boric oxide to a silica-soda-potash glass with a high silica content and containing barium oxide but little or no calcium oxide and strontium oxide, no magnesium oxide or zinc oxide, and either containing a small proportion of lead oxide or free from lead oxide."

Thus, the art has generally recognized that substitution of one divalent metal oxide, in particular strontia (SrO), for another will distinctly alter glass properties and characteristics. Furthermore, it has recognized a need for a special fluxing agent, e.g. fluorine, boric oxide, or a combination of fluorine and boric oxide, in order to achieve conventional glass melting and lamp working properties in the divalent metal oxide glasses other than lead glasses.

It is also well recognized that flux materials, in particular fluorine, tend to volatilize from the glass batch during melting. This alters the batch composition, a problem that has been solved by batch compensation. However, recent recognition of the need to avoid air pollution has created a demand for means of avoiding, or at least minimizing, the use of relatively volatile materials in glass melting, especially in large volume production items such as television tube components.

For example, one major industrial state now requires that the fluorine content in ambient air must not exceed one part per billion, and that green plant life should not pick up more than 40 parts per million during a six-month growing season. Another industrial state bases its requirement directly on effluent from a stack. It requires that the fluorine content of any stack effluent not exceed 50 pounds per hour, or 0.04 grains per cubic foot at any given time.

This creates a need to alter a strontia glass of the Connelly-Hares type by removing fluorine from the glass batch without substantially changing the physical properties of the glass, in particular the viscosity-temperature relationship which controls the lamp working characteristics of the glass. It is a primary purpose of the present invention to provide a solution to this problem. More specifically, it is a purpose of the invention to provide essentially fluoride-free glasses having physical characteristics corresponding to the glasses of the Connelly-Hares patent, and therefore capable of being substituted for such glasses in cathode ray tube production.

A suitable glass for the production of a cathode ray tube faceplate must have a strong capacity for absorbing X-ray radiation. It must also have a strong resistance to electron browning. The unique combination of these features that is provided by strontia as a glass additive is described in detail in the Connelly-Hares patent mentioned above.

The glass must of course have good electrical insulating properties. This means the electrical resistivity, as measured at 350° C., must be at least $10^7$ ohm-cm. Further, the glass must have physical properties compatible with standard tube processing operations, in particular sealing and bakeout. For example, the glass desirably has a thermal coefficient of expansion that does not exceed about $102 \times 10^{-7}/°$ C., a strain point not over 478° C. and a softening point not over 700° C.

I have now discovered a small family of glass compositions that are essentially fluoride-free, but which nevertheless meet these various property requirements. My new glasses are based on the use of limited amounts of lithia ($Li_2O$) as a fluxing agent supplemental to $Na_2O$ and/or $K_2O$, and the critical control of these various oxides as well as CaO, MgO, SrO, and $SiO_2$.

The invention is an improved faceplate for a television tube comprising an electron emitting means and an envelope having a faceplate composed of an alkali metal silicate glass containing strontia in its composition to absorb X-radiation while providing a strong resistance to discoloration from the electron bombardment, the improved glass faceplate having a composition that is essentially free of fluorine and that consists essentially, in percent by weight as calculated from the batch on an oxide basis, of 5–20 percent SrO, 0–15 percent BaO, the total BaO + SrO being 5–20 percent, 4–13 percent $K_2O$, 4–13 percent $Na_2O$, 8–20 percent total $K_2O$ + $Na_2O$, 0.2–2.0 percent $Li_2O$, 1.5–4 percent $Al_2O_3$, 0–5 percent CaO, 0–5 percent MgO, 0.25–2.0 percent $TiO_2$, 0.05–0.5 percent $CeO_2$, and the balance essentially silica.

Figure 2:
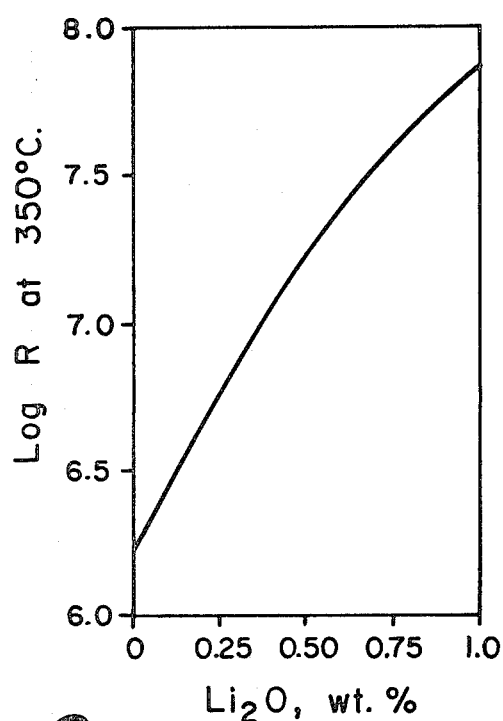

The invention is further described with respect to the accompanying drawing wherein, FIG. 1 is a partially schematic side view in section of a conventional color television tube, and FIG. 2 is a graphical illustration of a particular feature of the invention.

FIG. 1 shows a conventional color television tube comprising a glass envelope 10, an electron emitting gun assembly 18 and aperture mask 19. Envelope 10 includes a funnel section 11, a faceplate section 12 having a depending skirt 15 and a neck section 13. Funnel section 11 is customarily sealed to skirt 15 of faceplate section 12 with a sealing glass frit 14. This seal is normally made following the positioning of mask 19 within skirt 15 of faceplate section 12. For example, mask 19 may be positioned by attachment of tabs 16 to posts 17 formed on or sealed to the inside surface of skirt 15.

During tube operation, electrons are emitted from electron gun assembly 18 mounted in neck portion 13 of the envelope and are subjected to various accelerating and directional influences not here illustrated. Aperture mask 19 functions to produce electron beams which activate phosphor particles in screen 20 applied over the inside surface of faceplate section 12. As indicated earlier, faceplate section 12 must absorb both the electrons passing through the phosphor layer and the X-radiation generated by the impact of electrons on the phosphor.

The advent of color television greatly increased the electrical power requirements, and consequently the electron bombardment effects. This, coupled with the constant desire to further increase power, has created a critical need for a glass of increased X-ray absorbing power. As fully described in the Connelly-Hares patent mentioned earlier, this need has been met by the use of a strontia (SrO) glass for the production of faceplate section 12. The unique absorbing characteristics of strontia, as well as its high resistance to discoloration by electron bombardment, are described in detail in the Connelly-Hares patent and reference is made thereto. The present invention represents a further improvement in the strontia-containing glass faceplate of that patent.

In general, 5 percent SrO, and preferably at least 8 percent, is required in a glass to provide a substantial degree of absorbing capacity for X-radiation. This capacity of course increases with increasing amounts of SrO, but the permissible amount is limited. Substitution of SrO for BaO hardens a glass, that is makes it more difficult to melt. Also increasing amounts of SrO may increase the liquidus temperature and present crystallization problems. Accordingly, the SrO content should not exceed 20 percent and is preferably not over 15 percent.

Neither lead oxide (PbO) nor barium oxide (BaO) are required in the present glasses. However, either or both of these oxides may be desirable additives in relatively limited amounts. Lead oxide is particularly desirable for X-radiation absorption, but, as is well known, is a major contributor to discoloration by electron bombardment. Accordingly, this oxide is generally avoided and should not be present in amounts greater than about 2 percent in any event. BaO is unnecessary in the presence of at least 5 percent SrO for absorption purposes, but may be useful to facilitate glass melting. Accordingly, it may be used in conjunction with strontia in amounts up to about 15 percent, but the total BaO plus SrO should not exceed about 20 percent. It should be pointed out that, as a rule of thumb, about 2 percent by weight BaO provides a corresponding absorbing capacity for X-radiation to about 1 percent by weight of SrO.

A primary feature of the novel faceplate glasses of the present invention is a complete absence of fluorine from their compositions. This in turn permits the omission of fluorides from the glass batch, thereby eliminating from the melting process one of the most serious sources of air pollution from glass melting.

It is well known that fluorine has a strong fluxing action in most glasses. Thus, its customary effect is to produce a softer glass, that is a glass that melts at lower temperatures and in which any given viscosity will occur at a lower temperature than in the absence of fluorine. For example, comparative glass melts within the system of the present invention show that the presence of 0.7 percent fluorine in one of the present glasses will lower the viscosity-temperature curve in a uniform manner about 25° C.

The use of fluorine as a fluxing agent in electrical glasses has been particularly desirable because of its relatively minor influence on glass resistivity. Thus, a particular glass could be softened to improve its glass melting and lamp working characteristics without substantial sacrifice in electrical resistivity characteristics of the glass. The exclusion of fluorine from the present glasses has raised the problem of compensating for its fluxing and softening effect without sacrifice of electrical properties, or of the radiation absorbing and other properties peculiarly required in cathode ray tube glasses.

The traditional fluxes used in the glass industry are the alkali metal oxides soda ($Na_2O$) and potash ($K_2O$), in particular the former. Thus, soda lime glasses are the standard production glass for such large scale glass products as flat glass and container glass. However, the extent to which these alkali metal oxides may be used in electrical glasses is limited by their rather drastic influence on electrical resistivity. Specifically, the substitution of either soda or potash for silica in a glass tends to lower the electrical resistivity of the glass and at the same time increase the thermal coefficient of expansion of the glass.

A further significant feature of the present invention then is the inclusion of at least 0.2 percent lithia ($Li_2O$) in the glass compositions. Even such a minor amount of this oxide not only significantly softens the glass, that is decreases the glass viscosity at a given temperature, but also increases the electrical resistivity of the glass. This fortuitous situation permits softening a glass while still limiting the amount of soda employed in the glass as a flux. Further, it permits adjusting the soda and potash contents in a glass relative to one another in order to adjust softness and expansion of the glass while still maintaining good electrical resistivity. Thus, the potash and lithia contents in a glass may be increased at the expense of soda to thereby increase the electrical resistivity without substantial effect on the glass softness.

Any addition of $Li_2O$, however small, alters glass properties in the desired direction to some extent. Normally, however, at least 0.2 percent is necessary to provide a significant change to enable production of a color television tube faceplate. The $Li_2O$ content should not exceed 2 percent, and is preferably below 1 percent, because of batch cost and color problems from lithia mineral impurities. The glass should contain at least 4 percent of each of the fluxing oxides $Na_2O$ and $K_2O$, but not over 13% of either and not over 20 percent total of the two oxides. In general, I obtain optimum results with glasses in which the $K_2O$ content slightly exceeds the $Na_2O$ content and each content is in the range of 6–10 percent.

Alumina ($Al_2O_3$) is necessary to stabilize the faceplate glass against deterioration from atmospheric and/or acidic influences. This is commonly known as improving the chemical durability of the glass and at least 1.5 percent $Al_2O_3$ is required for that purpose. However, the content of this oxide should not exceed about 4 percent. Larger amounts provide no substantial advantage in chemical durability, but do tend to harden the glass undesirably.

Substitution of minor amounts of either lime (CaO) or magnesia (MgO) for $SiO_2$ in the present glasses tends to soften the glass and increase its electrical resistivity. Therefore, while the faceplate glass of the invention does not require either oxide, the presence of one, and preferably both, in the present glasses is highly desirable. Their content must, however, be limited to not over 5 percent on an individual basis, or 10 percent collectively, because of their tendency to substantially increase the glass liquidus. This is the lowest temperature at which crystals will begin to form when the glass is held thereat for a substantial length of time. This temperature is particularly significant in electrical glasses which may be subjected to intermediate elevated temperatures both during initial forming and during subsequent reworking operations.

Both cerium oxide ($CeO_2$) and titania ($TiO_2$) are vital additives in the present glasses for the purpose of inhibiting discoloration by X-radiation. Normally, the amount of $CeO_2$ is minimized because of cost and the supplemental effect of $TiO_2$ is employed to this end. Also, $TiO_2$ in limited amounts, has a fluxing action. It may, however, present coloration problems in larger amounts and therefore should not exceed about 2 percent.

In addition to the various glass components mentioned above, other compatible and well-known glass-making ingredients such as fining agents, colorants, and the like may be included in known manner in the present glasses. The balance of the glass composition then is essentially the primary glass former, silica. The content of this oxide will normally range from about 58 up to 70 percent. Higher silica contents unduly increase the glass softening point and the liquidus temperature, while glasses having contents below 58 percent generally lack adequate chemical durability.

The invention is further illustrated in the following table which sets forth, in weight percent on the oxide basis as calculated from the glass batch, the compositions of several glasses particularly suited to production of colored television tube faceplates. In addition, several relevant glass properties are set forth for each glass. These include: softening point (Soft.); annealing point (Ann.), and strain point (Str.) all in ° C.; logarithm of the electrical resistivity (Log R) at 250° C. and at 350° C. and thermal coefficient of expansion between 0° and 300° C. (Exp. × $10^{-7}$/° C.).

TABLE I

|  | 1 | 2 | 3 | 4 | 5 | 6 | 7 | 8 |
|---|---|---|---|---|---|---|---|---|
| $SiO_2$ | 63.8 | 64.6 | 64.6 | 63.3 | 62.8 | 62.9 | 64.6 | 62.1 |
| SrO | 11.2 | 11.4 | 11.4 | 11.4 | 11.4 | 11.5 | 12.4 | 5.4 |
| $K_2O$ | 9.5 | 8.7 | 8.7 | 10.5 | 10.3 | 8.5 | 8.7 | 9.7 |
| $Na_2O$ | 7.5 | 8.1 | 8.1 | 5.4 | 6.4 | 8.3 | 8.1 | 6.3 |
| $Al_2O_3$ | 3.4 | 2.0 | 2.0 | 3.4 | 3.4 | 3.4 | 2.0 | 2.3 |

TABLE I—Continued

|  | 1 | 2 | 3 | 4 | 5 | 6 | 7 | 8 |
|---|---|---|---|---|---|---|---|---|
| CaO | 2.2 | 3.4 | 2.0 | 2.0 | 2.0 | 2.0 | 1.4 | |
| $TiO_2$ | 0.5 | 0.5 | 0.5 | 0.5 | 0.5 | 0.5 | 0.5 | 0.5 |
| MgO | 0.4 | | 1.4 | 1.4 | 1.4 | 1.4 | 1.0 | |
| $Sb_2O_3$ | 0.4 | 0.4 | 0.4 | 0.4 | 0.4 | 0.4 | 0.4 | 0.4 |
| BaO | 0.2 | 0.2 | 0.2 | 0.2 | 0.2 | 0.2 | 0.2 | 12.7 |
| $As_2O_3$ | 0.2 | 0.2 | 0.2 | 0.2 | 0.2 | 0.2 | 0.2 | 0.2 |
| $CeO_2$ | 0.2 | 0.2 | 0.2 | 0.2 | 0.2 | 0.2 | 0.2 | 0.1 |
| $Li_2O$ | 0.5 | 0.3 | 0.3 | 1.1 | 0.8 | 0.5 | 0.3 | 0.3 |
| Soft | 692 | 691 | 695 | 695 | 689 | 688 | 688 | 677 |
| Ann | 506 | 512 | 508 | 507 | 502 | 503 | 505 | 488 |
| Str | 467 | 477 | 469 | 473 | 468 | 467 | 466 | 453 |
| Exp | 100.3 | 100.7 | 99.0 | 97.0 | 99.2 | 99.1 | 99.6 | 101.1 |
| Log R 350°C | 7.225 | 7.160 | 7.135 | 7.780 | 7.605 | 7.225 | 7.080 | 7.645 |
| Log R 250°C | 9.110 | 9.045 | 8.990 | 9.780 | 9.555 | 9.120 | 8.915 | 9.630 |

The glass of Example 3 provides properties essentially identical with previously used faceplate glasses which meet industry specifications of: Coef. of Exp., 98–100 × $10^{-7}$ °C.; softening point, 682°–695° C.; strain point, 460°–475° C.; log R at 350° C. above 7.0; liquidus, under 900° C. Based on this glass, then, the preferred embodiments of the present invention have compositions within the following ranges:

| | |
|---|---|
| $SiO_2$ | 61–65% |
| SrO | 10–13% |
| $Li_2O$ | 0.2–0.8% |
| $K_2O$ | 7–10% |
| $Na_2O$ | 6–9% |
| $Al_2O_3$ | 1.5–3.5% |
| CaO + MgO | 2–4% |
| $TiO_2$ | 0.2–0.7% |
| $CeO_2$ | 0.1–0.3% |
| $As_2O_3 + Sb_2O_3$ | 0.4–0.8% |

A series of glass melts was designed to illustrate the influence of $Li_2O$ on electrical resistivity, as well as the ability to provide approximately equivalent viscosity characteristics by adjustment of $Na_2O$ and $K_2O$ contents in the glasses. In this composition series, $Li_2O$ was substituted for $SiO_2$ in 0.25 percent weight increments. With each $Li_2O$ increment, a 2 percent substitution of $K_2O$ for $Na_2O$ was also made. The base glass consisted in percent by weight of 63.4 percent $SiO_2$, 11.5 percent SrO, 4.5 percent $K_2O$, 12.2 percent $Na_2O$, 3.4 percent $Al_2O_3$, 2.0 percent CaO, 1.5 percent MgO, 0.2 percent BaO, 0.5 percent $TiO_2$, 0.4 percent $Sb_2O_3$, 0.2 percent $As_2O_3$ and 0.2 percent $CeO_2$.

The alkali metal oxide contents in the glasses as well as relevant electrical resistivity and viscosity-temperature data are shown in the following table:

TABLE II

|  | 1 | 2 | 3 | 4 | 5 |
|---|---|---|---|---|---|
| $Li_2O$ | — | 0.25 | 0.5 | 0.75 | 1.0 |
| $K_2O$ | 4.5 | 6.5 | 8.5 | 10.4 | 12.4 |
| $Na_2O$ | 12.2 | 10.2 | 8.3 | 6.4 | 4.6 |
| Log R. (350°C.) | 6.25 | 6.75 | 7.2 | 7.6 | 7.9 |
| Soft.Pt. (°C.) | 693 | 688 | 688 | 689 | 690 |
| Strain Pt. (°C.) | 484 | 471 | 467 | 468 | 466 |
| Exp. (×$10^{-7}$ /°C.) | 99.4 | 99.3 | 99.1 | 99.2 | 98.1 |

It will be observed that the electrical resistivity consistently increases with incremental addition of $Li_2O$. At the same time the viscosity is maintained relatively constant as shown by the consistent softening and strain temperatures. Also, the coefficient of thermal expansion is maintained relatively steady. The effect of the $Li_2O$ increments on electrical resistivity is graphically depicted in FIG. 2 wherein $Li_2O$ content in weight percent is plotted on the horizontal axis and the logarithm of electrical resistivity (Log R), as measured at 350° C., is plotted on the vertical axis.

A further series of melts was made to compare the physical properties of (1) a glass containing fluorine as a flux additive, (2) the same glass containing neither fluorine nor lithia, (3) the same glass containing lithia substituted for fluorine as a flux additive, and (4) glass No. 3 adjusted to provide a glass more closely approaching the viscosity and expansion characteristics of No. 1. The glass compositions, together with several relevant properties measured on the corresponding glasses are shown in TABLE III below:

TABLE III

|  | 1 | 2 | 3 | 4 |
|---|---|---|---|---|
| $SiO_2$ | 64.0 | 64.4 | 63.9 | 62.9 |
| SrO | 11.2 | 11.2 | 11.2 | 11.5 |
| $K_2O$ | 9.5 | 9.5 | 9.5 | 8.4 |
| $Na_2O$ | 7.5 | 7.5 | 7.5 | 8.3 |
| $Al_2O_3$ | 3.4 | 3.4 | 3.4 | 3.4 |
| CaO | 2.3 | 2.3 | 2.3 | 2.0 |
| $TiO_2$ | 0.5 | 0.5 | 0.5 | 0.5 |
| MgO | 0.4 | 0.4 | 0.4 | 1.5 |
| $Sb_2O_3$ | 0.4 | 0.4 | 0.4 | 0.4 |
| BaO | 0.2 | 0.2 | 0.2 | 0.2 |
| $As_2O_3$ | 0.2 | 0.2 | 0.2 | 0.2 |
| $CeO_2$ | 0.2 | 0.2 | 0.2 | 0.2 |
| F | 0.7 | — | — | — |
| $Li_2O$ | — | — | 0.5 | 0.5 |
| Soft.Pt. (°C.) | 688 | 714 | 692 | 688 |
| Ann.Pt. (°C.) | 503 | 528 | 506 | 503 |
| Strain Pt. (°C.) | 462 | 485 | 467 | 467 |
| Exp. (×$10^{-7}$/°C.) | 99.0 | 98.9 | 100.3 | 99.1 |
| Liquidus (°C.) | 940 | 927 | — | 862 |
| Log R (350°C.) | 7.3 | 7.0 | 7.2 | 7.2 |

A comparison of glasses 1 and 2 in TABLE III shows the substantial hardening effect (increase in temperature for equal viscosity) occasioned by removal of 0.7 percent F from the base glass composition. A comparison of glasses 2 and 3 shows the effect of adding 0.5 percent $Li_2O$ in replacement of the fluorine removed. Thus, the resistivity is substantially higher, the glass is softened almost to the original levels, but the coefficient of expansion is raised. Composition 4 illustrates the manner in which the other oxides may be adjusted to closely restore all the original properties of the fluorine-containing glass. In addition, note that the glass liquidus temperature is even lower than that of the parent glass.

I claim:

1. In a television picture tube comprising an electron emitting means and an envelope having a faceplate composed of an alkali metal silicate glass exhibiting a coefficient of thermal expansion between about $98-100 \times 10^{-7}/°$ C., a softening point between about $682°-695°$ C., a strain point between about $460°-475°$ C., a log R at 350° C. about 7.0, a liquidus under 900° C., and containing strontia in its composition to absorb X-radiation while providing a strong resistance to glass discoloration from electron bombardment, an improved glass faceplate wherein the composition of the faceplate glass is essentially free from fluorine and consists essentially, in percent by weight as calculated from the batch on an oxide basis, of about 61-65 percent $SiO_2$, 10-13 percent SrO, 0.2-0.8 percent $Li_2O$, 7-10 percent $K_2O$, 6-9 percent $Na_2O$, 1.5-3.5 percent $Al_2O_3$, 2-4 percent CaO + MgO, 0.2-0.7 percent $TiO_2$, 0.1-0.3 percent $CeO_2$, and 0.4-0.8 percent $As_2O_3$ + $Sb_2O_3$.

* * * * *